M. BOHLIG.
DEVICE FOR FILLING ICE CREAM CORNETS.
APPLICATION FILED OCT. 7, 1907.
No. 900,348.
Patented Oct. 6, 1908.
2 SHEETS—SHEET 1.
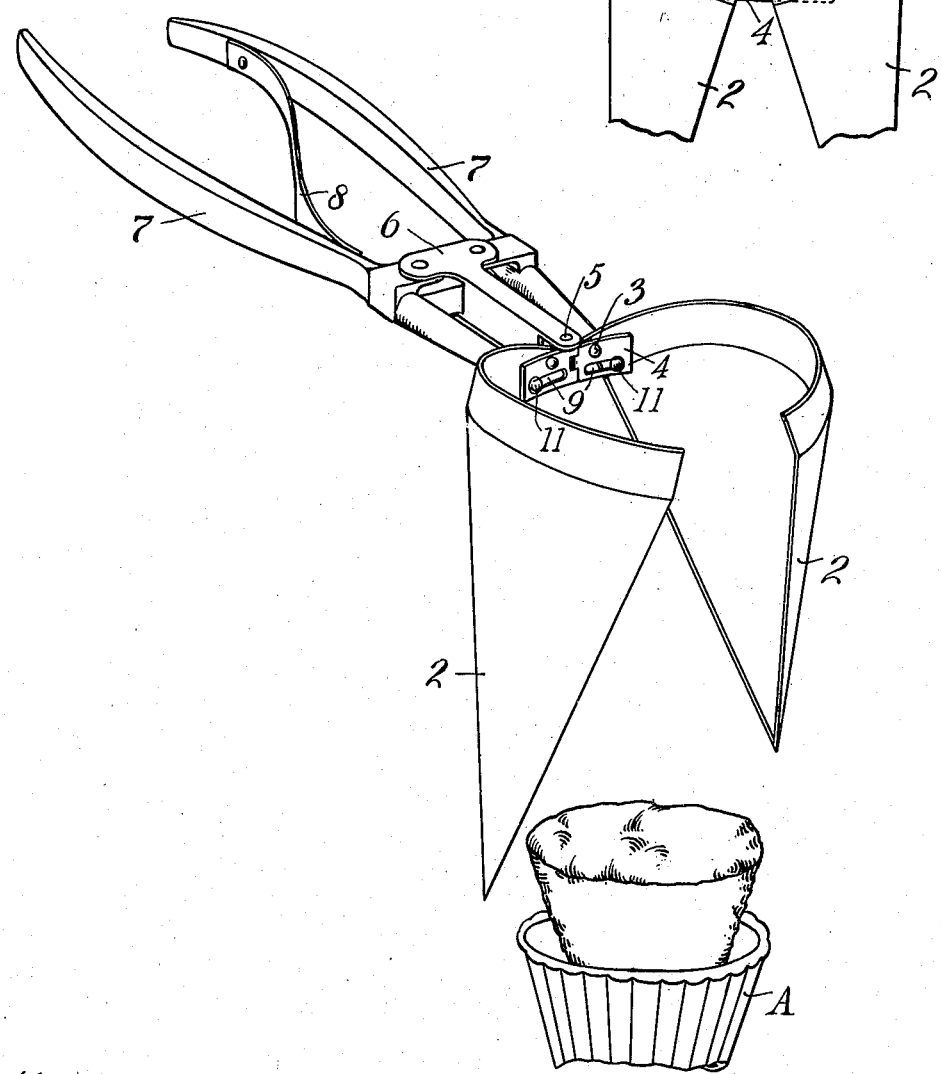

M. BOHLIG.
DEVICE FOR FILLING ICE CREAM CORNETS.
APPLICATION FILED OCT. 7, 1907.
900,348.
Patented Oct. 6, 1908.
2 SHEETS—SHEET 2.
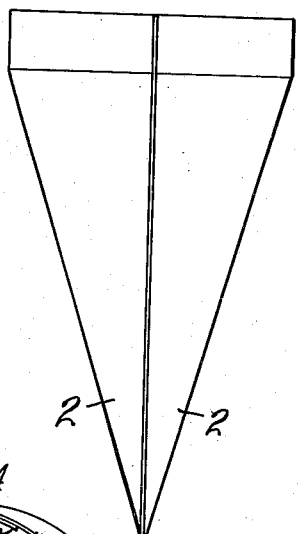
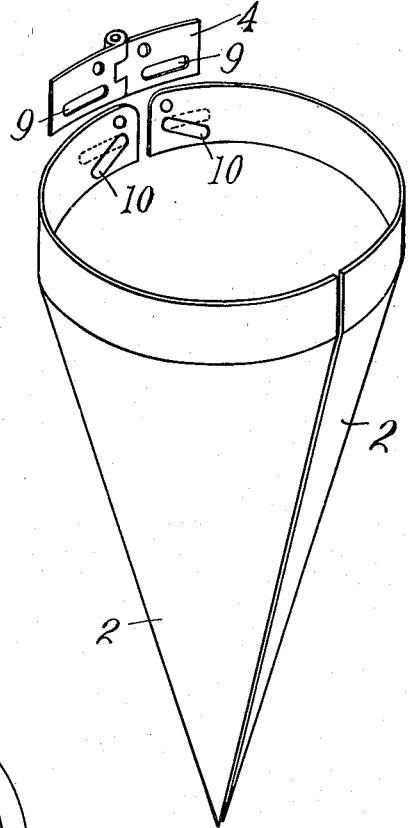
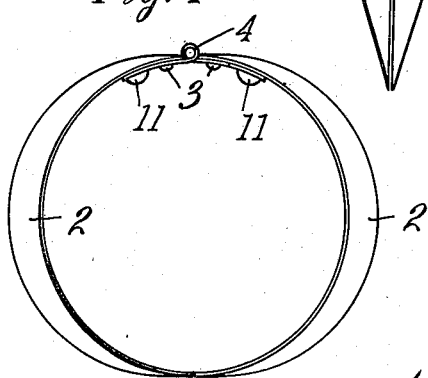
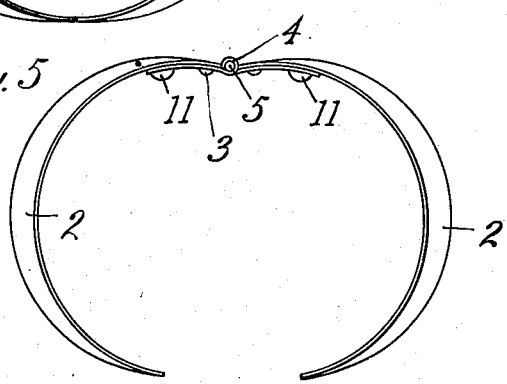
Witnesses,
George Voelker
Hattie Smith
Inventor,
Martin Bohlig
by Lothrop & Johnson
his Attorneys.

UNITED STATES PATENT OFFICE.

MARTIN BOHLIG, OF ST. PAUL, MINNESOTA, ASSIGNOR TO BOHLIG MANUFACTURING COMPANY, OF ST. PAUL, MINNESOTA, A CORPORATION OF MINNESOTA.

DEVICE FOR FILLING ICE-CREAM CORNETS.

No. 900,348.    Specification of Letters Patent.    Patented Oct. 6, 1908.

Application filed October 7, 1907. Serial No. 396,215.

*To all whom it may concern:*

Be it known that I, MARTIN BOHLIG, a citizen of the United States, residing at St. Paul, in the county of Ramsey and State of Minnesota, have invented certain new and useful Improvements in Devices for Filling Ice-Cream Cornets, of which the following is a specification.

My invention relates to improvements in means for filling ice cream cornets, its object being particularly to provide an improved form of cup for receiving ice cream which cup may be opened to allow the ice cream to drop directly into the cornets.

To this end my invention consists in the features of construction and combination hereinafter more particularly described and claimed.

In the accompanying drawings forming part of this specification, Figure 1 is a perspective view of my improved invention in use, Fig. 2 is a rear elevation of the upper end of the delivery receptacle or cup, Fig. 3 is a front elevation of the receptacle, Fig. 4 is a top view of the same closed, Fig. 5 is a similar view open, and Fig. 6 is a perspective view of the receptacle and of the supporting hinge therefor.

As shown in the drawings the cup or receptacle is of cone shape to conform to the shape of an ordinary ice cream cornet A, the cup consisting of two similar members 2 having pivotal support 3 to the upper ends of the hinge 4. The pintle 5 of the hinge 4 is secured in the central frame work 6 in the outwardly extending arms of which is fulcrumed the handles 7. The outer ends of the handles are normally held separated, to hold the cup closed, by a suitable spring 8.

In order to permit opening of the cup I provide the hinge and cup members with horizontally extending slots 9 and 10, respectively, the slots 10 extending downwardly as indicated best in Fig. 6. The inner ends of the handles 7 carry pins 11 which extend through registering pairs of said slots.

In use, by pressing the outer ends of the handles together the pins 11 traveling in the slots will first slightly swing the opposite sides of the cup upward upon their pivots 3, the further turning of the lever arms turning the hinge members upon their pintle and carrying the cup members to full open position as indicated in Fig. 1. As the lever arms are first turned to tilt the cup members it will result in slightly squeezing the upper end of the ice cream to hold it from dropping and at the same time free it from the sides of the cup allowing the lower end of the ice cream to be positioned over the top of the cornet A. The continued opening movement of the cup members frees the ice cream and allows it to drop into the cornet.

I claim:

1. A device of the class described comprising a handle, a two part receptacle pivotally supported upon one end of said handle, and means for swinging said receptacle parts away from each other in a progressing degree toward their lower ends, for the purpose set forth.

2. A device of the class described comprising a pair of fulcrumed handles, a two-part receptacle having hinge connection, and a pin and slot connection between said receptacle parts and the adjacent ends of said handles for the purpose set forth.

3. A device of the class described comprising in combination a pair of fulcrumed handles, a two-part receptacle pivotally supported on a connecting hinge, and a slot and pin connection between the inner ends of said lever arms and said receptacle and hinge for the purpose set forth.

4. A device of the class described comprising, in combination a pair of fulcrumed lever arms, a two part receptacle pivotally supported upon a connecting hinge, and a connection between the receptacle parts and the adjacent ends of said lever arms causing said receptacle parts to be tilted apart at their lower ends as the inner ends of said lever arms are forced apart.

5. A device of the class described comprising in combination a pair of fulcrumed lever arms, a two-part receptacle having independent pivotal support upon a connecting hinge, the leaves of said hinge being formed with longitudinally extending slots and the adjacent portions of said receptacle parts being formed with downwardly extending slots, and pins carried by the inner ends of said lever arms and extending through said slots, for the purpose set forth.

6. A device of the class described comprising in combination a pair of fulcrumed lever arms, a strap hinge, a two-part receptacle pivotally supported upon the leaves of said hinge said hinge leaves being formed with longitudinally extending slots, and said receptacle parts being formed with adjacent downwardly extending slots, and pins carried by the inner ends of said lever arms and extending through said slots for the purpose set forth.

7. A device of the class described, comprising a two part receptacle pivotally supported at their upper ends, and means for swinging said receptacle parts away from each other in a progressing degree toward their lower ends to form a bottom opening larger than the normal top opening of said receptacle.

8. A device of the class described, comprising a two part receptacle a pivot support therefor, and means for swinging said receptacle parts away from each other upon said pivot support to form an unobstructed opening at the bottom of the receptacle wide enough to permit the passage therethrough of any contents of said receptacle.

In testimony whereof I affix my signature in presence of two witnesses.

MARTIN BOHLIG.

Witnesses:
H. S. JOHNSON,
HATTIE SMITH.